United States Patent

[11] 3,580,598

| [72] | Inventor | Robert C. de Pauw |
| | | 18 Edgewood Hills, East Peoria, Ill. 61611 |
| [21] | Appl. No. | 817,763 |
| [22] | Filed | Apr. 21, 1969 |
| [45] | Patented | May 25, 1971 |

[54] TOBOGGAN
22 Claims, 20 Drawing Figs.

[52] U.S. Cl. .................................................. 280/18
[51] Int. Cl. ............................................... B62b 13/00
[50] Field of Search ................................... 280/18, 19, 12; 9/310

[56] References Cited
UNITED STATES PATENTS

| 2,139,513 | 12/1938 | Nelson et al. | 280/18 |
| 2,531,946 | 11/1950 | Parker | 280/18 |
| 3,147,020 | 9/1964 | Dahl | 280/18 |
| 3,428,979 | 2/1969 | Johnson | 9/310 |
| 3,453,000 | 7/1969 | Asher | 280/18 |
| 201,815 | 8/1965 | Greenberg | 280/18 |

FOREIGN PATENTS

| 1,461,212 | 12/1965 | France | 280/18 |

Primary Examiner—Kenneth H. Betts
Assistant Examiner—Robert R. Song
Attorney—Hofgren, Wegner, Allen, Stellman & McCord ABSTRACT: A steerable toboggan having a transversely curved body with longitudinal corrugations and steering ribs along each side. The steering ribs are deeper and narrower than the corrugations, and are curved with wider spacing at the front than at the rear.

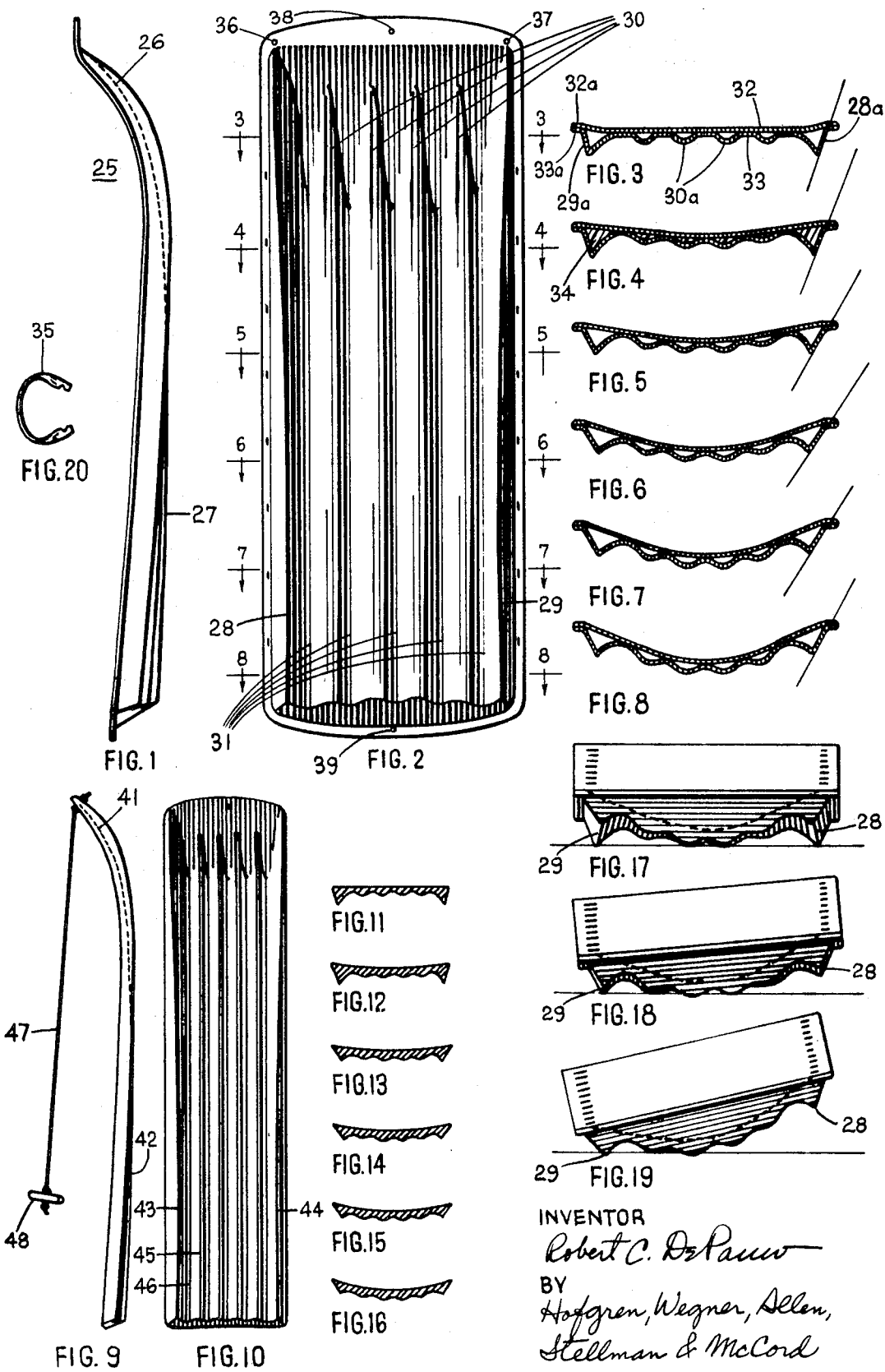

TOBOGGAN

This invention is concerned primarily with a sled and more particularly with a steerable toboggan.

A conventional toboggan has a flat surface in contact with the snow on which it slides. It is difficult to exercise any degree of steering control even with a maximum effort by the passengers to lean and tilt the toboggan. Also, it has a tendency to spin and go into a sideways skid.

I have found that longitudinal corrugations on the bottom of the toboggan provide stability in a straight downhill slide. Steering ribs along each side permit controlled turns upon packed or light snows. Further, a transversely curved body permits controlled banking of the front end plane to turn in deep snow.

Some features of the invention may be utilized in sliding or coasting vehicles of other types to provide increased stability and control. For example, a towed surfboard of buoyant material with the corrugations, ribs and transverse curvature is more easily controlled than a flat surfboard or one with a single stabilizing fin. Similarly, improved control is afforded both snow and water skis with the invention. In the following description and claims where reference is made to a toboggan, it will be understood that the term is intended to apply to other similar vehicles.

One feature of the invention is the provision of a toboggan having a body portion which is curved transversely.

Another feature is that a pair of steering surfaces or ribs depend from the transversely curved body and are spaced outwardly from the longitudinal center line thereof. More particularly, in a preferred embodiment of the invention, the transverse curvature of the body portion is greater at the rear than at the front, and the steering surfaces depend from the lateral edges of the body and extend forwardly from the rear thereof.

Another feature is the provision of a longitudinal guiding surface on the body portion, between the steering surfaces.

A further feature is that the steering surfaces are longitudinal ribs which extend along substantially the entire length of the lateral edges of the body portion and the longitudinal guiding surface comprises corrugations between the ribs. Specifically, the ribs are both deeper and narrower than the corrugations.

Still another feature is that the toboggan has an under surface with longitudinally extending corrugations therein and an upper surface which is smooth, the surfaces comprising spaced panels with sealed air spaces or a foamed plastic filler between them.

And yet another feature is that the upper surface smoothly repeats the transverse curvature of the bottom of the toboggan thereby providing a concave seat which has greater curvature at the rear than toward the front.

A further feature is a longitudinal curvature which allows an orderly and gradual increase of the transverse curvature toward the rear; works with transverse curvature to loft the side ribbed runners gradually toward the rear; and adds rigidity to the corrugated guiding surface and the steering surfaces.

A further feature is that the toboggan is formed of two panels, bonded together and defining a space which may be filled to rigidify the structure.

Yet another feature is that the upper panel is bonded to the tops of the corrugations and along the outer edges of the lower panel, defining air spaces corresponding to the guiding surface corrugations and the steering ribs.

Still another feature is the provision of a peripheral flange which forms a flat contacting area to bond the top and bottom pieces all along the outside. The flange protrudes at front to form a shield to settle snow dust. Holes in the flange serve for rope attachment.

And a further feature is a pliable plastic handle designed for immediate and easy attachment into holes in the side flanges. This allows placement of handles to suit one or more riders and removal of handles for use of toboggan on water.

Further features and advantages will readily be apparent from the following specification and from the drawings, in which:

FIG. 1 is an elevation of a toboggan embodying the invention, standing on end;

FIG. 2 is a bottom plan thereof;

FIGS. 3 through 8 are series of transverse sections through the toboggan, taken generally along a line corresponding with the bottom surface of each section;

FIG. 9 is an elevation of a modified toboggan intended for a single standing rider;

FIG. 10 is a bottom plan of the toboggan of FIG. 9;

FIGS. 11 through 16 are transverse sections through the toboggan of FIGS. 9 and 10, taken generally along lines corresponding with the bottom surfaces of each section;

FIGS. 17 through 19 are series of rear views illustrating how the steering rib is brought into action to provide controlled turning; and FIG. 20 is a side view of a removable handle for the toboggan.

A preferred embodiment of the invention is illustrated by the sled 25 in FIGS. 1 through 8. The sled has an elongated body with an upturned planar forward portion 26 and a main body portion 27 extending rearwardly therefrom. The upturned forward portion enables the sled to ride over irregularities in the surface of the snow, as is usual.

The main body portion 17 extends rearwardly from the forward portion, the length being about 40 inches for a sled intended for one to three seated passengers. The under surface of the main body portion 27 is curved in both the longitudinal and transverse planes. The longitudinal curvature is concave upwardly and is on a radius several times the radius of curvature near the upturned forward portion 26. The degree of transverse curvature varies along the length of the body and is greater at the rear than at the front thereof.

Longitudinal steering ribs 28 and 29 extend the length of the main body portion 27, along the lateral edges thereof. The ribs may be located inwardly from the lateral body edges so long as they are spaced one on either side of the longitudinal axis of the sled. The ribs are spaced wider at front and gradually narrowing toward the longitudinal axis at the rear. Preferably, for maximum turning effect, the ribs are located as shown along the lateral edges of the body and have a curvature with the greatest spacing at the front, the ribs converging to a point of minimum spacing (FIG. 6), and diverging at the rear end. Between steering ribs 28 and 29 the under surface of the sled has a corrugated configuration with alternate ribs 30 and grooves 31.

The transverse curvature of the sled increases toward the rear as shown in FIGS. 3 through 8. In FIG. 3, a section taken immediately forward of the transition between the upturned forward portion of the body and the rearwardly extending main body portion, the sled is flat. At each succeeding section, the degree of curvature is greater so that the lateral edges of the sled are higher and higher above the bottom surface defined by the two central corrugation ribs 30a. The steering ribs at the rear are out of action during a straight run and the corrugations control movement.

The longitudinal steering ribs are preferably deeper and narrower than the corrugations so that when the rider leans to turn, they will dig into the snow and provide a turning action, described below.

When the sled is running straight down a hill, the direction of motion is aligned with the corrugations 30. The sled is further stabilized with the equalized bite of the front end protrusions of the steering ribs 28, 29. If the rider wishes to turn, it is necessary merely to lean in the direction of the turn. This forces the longitudinal steering rib on the down side of the sled into the snow and lifts the upper steering rib out of the snow. As a result, the front end of the downside begins to take command and the sled executes a smooth turn. As the rider leans farther and farther from an upright position, tilting the sled to a greater degree, more and more of the downside runner takes command and the turn which is made becomes sharper. FIG. 17 shows the sled in a level position for straight travel. In FIG. 18 there is a slight tilt which results in a long slow turn. FIG. 19 illustrates a greater degree of tilt which will cause a sharper turn.

The turning action of the steering ribs 28 and 29 is enhanced by the fact that the outer surfaces 28a and 29a of the ribs are inclined to the vertical and the ribs are curved. An examination of the surfaces in FIGS. 3 through 8 shows that the inclination is greater toward the rear of the sled than at the front; and that it is greatest at an intermediate point, as in the section of FIG. 7. Further, the upturned forward portion 26 presents a planar surface effective to facilitate turning in deep snow. When the rider leans in the concave seat, he angles the front end plane into and upon the snow causing the toboggan to make a banking turn.

The sled is preferably formed of upper and lower panels 32 and 33, FIG. 3, which may be bonded together along peripheral flanges 32a and 33a and also where the upper panel meets the lower along the length of the grooves 31 of the corrugations. The multiple bonds between the panels reinforce the sled. The panels may suitably be made of an epoxy resin, strengthened with fiber glass, sprayed or molded on a form to the desired configuration. For example, sheets of plastic such as ABS Polymer, Polystyrene or Royalex may be vacuum formed to the desired configuration. The cavities defined between the panels can be filled with a suitable material 34, light in weight and having sufficient strength in compression to add rigidity, support the weight of passengers and to allow flotation in water, as a foamed urethane plastic. In the interests of economy, the cavities defined may remain as sealed air spaces.

Handles 35 (only one shown) are secured to the flanges along either side of the sled. The handle is a strip of resilient plastic with the ends twisted 90° and notched to engage openings in the flange. The handles may be quickly attached to provide handholds at appropriate locations for riders on snow or water. They also are easily removed when handles are not needed, as for a standing rider.

The upper panel 32 is smooth and curved to follow the general contour of bottom panel 33. Riders may either sit or stand on the sled as desired. Single riders should sit or stand toward the rear to locate their weight to best advantage for steering.

Holes are provided in the flange for securing tow ropes, as desired. A pair of holes 36, 37 at the forward corners permits attachment of a bridle, not shown. Centrally located holes 38 and 39 in the front and rear flanges, respectively, permit attachment of single ropes.

A smaller sled intended primarily for a standing rider is shown in FIGS. 9 and 10. The general configuration is the same. The body of the sled has a planar upturned forward portion 41 and a rearwardly extending main body portion 42. The main body portion is curved both longitudinally and transversely, with the transverse curvature increasing toward the rear of the sled. A pair of longitudinal steering ribs 43 and 44 are located along the lateral edges of the sled. The under surface between the steering ribs is corrugated with alternate ribs 45 and grooves 46. A rope 47 is secured to the bow of the sled and has a handle 48 which the standing rider can grasp. Again, turning can be achieved by the rider shifting his weight from one side to the other as he stands on the sled. With the weight of the standing rider concentrated at the rear, the turning action is more effective than with the weight forward.

I claim:

1. A steerable toboggan comprising:
    an elongated body having an upwardly curved front portion and a transversely curved main body portion extending rearwardly therefrom;
    a pair of longitudinal steering surfaces depending from the main body portion and spaced outwardly from the longitudinal center line thereof; and
    a longitudinal guiding surface depending from said main body portion between said steering surfaces, the distance which the guiding surface extends from the plane of the main body portion being less than the distance which the steering surfaces extend from the plane of the main body portion.

2. The toboggan of claim 1 in which said steering surfaces depend from the lateral edges of the main body portion and extend forwardly from the rear thereof.

3. The toboggan of claim 1 in which said main body portion is curved upwardly toward the rear, in a plane along the longitudinal axis thereof.

4. The toboggan of claim 1 in which the transverse curvature at the rear of said main body portion is greater than at the front thereof.

5. The toboggan of claim 4 in which said steering surfaces are longitudinal ribs extending downwardly from the main body portion along the lateral edges thereof.

6. The toboggan of claim 1 in which said steering surfaces are longitudinal ribs extending along substantially the entire length of the lateral edges of said main body portion.

7. The toboggan of claim 6 in which said guiding surface is a rib located between the steering surfaces.

8. The toboggan of claim 6 in which said guiding surface is a channel located between the steering surfaces.

9. The toboggan of claim 6 in which the guiding surface is provided by longitudinal corrugations wherein said steering ribs are deeper than said corrugations.

10. The toboggan of claim 9 in which said steering ribs are narrower than the ribs of said corrugations.

11. The toboggan of claim 6 in which the outer surface of said longitudinal rib is inclined from the vertical, with the inclination being greater at the rear of said body portion than at the front thereof.

12. The toboggan of claim 11 in which the inclination of the outer surface of the rib is greater at the center of the body portion than at either end thereof.

13. The toboggan of claim 6 in which the steering ribs are spaced apart a greater distance at the front of the body portion than at the rear.

14. The toboggan of claim 13 in which the ribs are closest together at a point between the ends of the body portion.

15. The toboggan of claim 14 in which the ribs are curved.

16. An elongated body with an upwardly curved front portion and an elongated main body portion extending rearwardly therefrom, the front and main body portions being joined by a section which is substantially flat transversely of the toboggan, the main body portion being transversely curved with the curvature increasing gradually from said flat section to the rear thereof, the main body portion having an under surface with longitudinally extending corrugations therein and an upper surface which is smooth.

17. The toboggan of claim 16 in which said corrugated under surface is transversely curved and concave upwardly, and said smooth upper surface has a corresponding upwardly concave curvature.

18. The toboggan of claim 16 in which the under and upper surfaces are spaced apart panels sealed to define a space.

19. The toboggan of claim 18 in which said spaced panels have peripheral surfaces bonded together.

20. The toboggan of claim 19 in which the longitudinal corrugations of the under surface panel have longitudinal groove portions bonded to the upper surface panel.

21. The toboggan of claim 18 with a foamed plastic filler in said space.

22. The toboggan of claim 18 in which said space is filled with air.